United States Patent
Zanardi

(10) Patent No.: US 9,719,497 B2
(45) Date of Patent: Aug. 1, 2017

(54) SUPPLY ASSEMBLY FOR A TURBINE OF A SOLAR THERMODYNAMIC SYSTEM AND SOLAR THERMODYNAMIC SYSTEM COMPRISING SAID ASSEMBLY

(71) Applicant: ALFA LAVAL CORPORATE AB, Lund (SE)

(72) Inventor: Luca Zanardi, Bergamo (IT)

(73) Assignee: ALFA LAVAL CORPORATE AB, Lund (SE)

( * ) Notice: Subject to any disclaimer, the term of this patent is extended or adjusted under 35 U.S.C. 154(b) by 65 days.

(21) Appl. No.: 14/893,032
(22) PCT Filed: May 28, 2014
(86) PCT No.: PCT/IB2014/061787
§ 371 (c)(1),
(2) Date: Nov. 20, 2015
(87) PCT Pub. No.: WO2014/191937
PCT Pub. Date: Dec. 4, 2014

(65) Prior Publication Data
US 2016/0097375 A1    Apr. 7, 2016

(30) Foreign Application Priority Data

May 29, 2013 (IT) .............................. MI2013A0877

(51) Int. Cl.
*F03G 6/00* (2006.01)
*F03G 6/06* (2006.01)
(Continued)

(52) U.S. Cl.
CPC ................ *F03G 6/065* (2013.01); *F01K 3/18* (2013.01); *F01K 7/16* (2013.01); *F01K 11/02* (2013.01);
(Continued)

(58) Field of Classification Search
CPC ... F01K 11/02; F01K 3/18; F01K 7/16; F03G 6/00; F03G 6/065; F28D 7/024; F28D 7/12; Y02E 10/46
See application file for complete search history.

(56) References Cited

U.S. PATENT DOCUMENTS

| 4,036,028 A * | 7/1977 | Mandrin | F01K 23/02 60/39.465 |
| 8,661,820 B2 * | 3/2014 | Mak | F01K 13/00 60/651 |

(Continued)

FOREIGN PATENT DOCUMENTS

| DE | 10 2010 009 485 A1 | 9/2011 |
| EP | 2 667 135 A1 | 11/2013 |

(Continued)

OTHER PUBLICATIONS

Search Report issued on Jun. 7, 2016, by the Spanish Patent Office in corresponding Spanish Patent Application No. 201590117. (4 pgs).

(Continued)

*Primary Examiner* — Jesse Bogue
(74) *Attorney, Agent, or Firm* — Buchanan Ingersoll & Rooney PC

(57) ABSTRACT

Supply assembly for a turbine of a solar thermodynamic system provided with plural multiple parabolic mirrors for heating a first thermal carrier fluid contained in a tank to a first temperature, comprising a column structure provided at the upper part with an exit. The column structure comprises: a lower portion provided with two inlets connected to the tank to be supplied with the first thermal carrier fluid, the lower portion comprising first and second heat exchangers supplied with a second thermal carrier fluid respectively to an overheated temperature and re-overheating temperature; an upper portion fluidically connected with the lower portion, the upper portion comprising a boiler to bring the second fluid from a pre-heating temperature to a boiling temperature, and a cylindrical body arranged on the boiler; a pre-heating and supplying structure for heating the second thermal carrier fluid to the pre-heating temperature and supply it to the column structure.

12 Claims, 3 Drawing Sheets

(51) Int. Cl.
*F01K 3/18* (2006.01)
*F01K 7/16* (2006.01)
*F01K 11/02* (2006.01)
F28D 7/02 (2006.01)
F28D 7/12 (2006.01)

(52) U.S. Cl.
CPC ............. *F03G 6/00* (2013.01); *F28D 7/024* (2013.01); *F28D 7/12* (2013.01); *Y02E 10/46* (2013.01)

(56) References Cited

U.S. PATENT DOCUMENTS

2014/0116663 A1* 5/2014 Kataoka ............... F28D 7/103
  165/163
2014/0182291 A1* 7/2014 Madison ............... F03G 6/003
  60/645
2015/0013953 A1* 1/2015 Mandelberg ........... F28D 7/12
  165/164
2017/0038149 A1* 2/2017 Spreeman ............. F28D 7/103

FOREIGN PATENT DOCUMENTS

| JP | 08-327256 A | 12/1996 |
| NL | 1 031 546 C1 | 10/2007 |
| WO | WO 2013/000013 A1 | 1/2013 |

OTHER PUBLICATIONS

International Search Report (PCT/ISA/210) mailed on Sep. 23, 2014, by the European Patent Office as the International Searching Authority for International Application No. PCT/IB2014/061787.
Written Opinion (PCT/ISA/237) mailed on Sep. 23, 2014, by the European Patent Office as the International Searching Authority for International Application No. PCT/IB2014/061787.

* cited by examiner

SUPPLY ASSEMBLY FOR A TURBINE OF A SOLAR THERMODYNAMIC SYSTEM AND SOLAR THERMODYNAMIC SYSTEM COMPRISING SAID ASSEMBLY

The present invention refers to a supply assembly for a turbine of a solar thermodynamic system and a solar thermodynamic system comprising such assembly. Today the so-called thermodynamic solar systems which are capable of converting the heat energy deriving from the solar radiation into electrical energy are known. In detail, such thermodynamic solar systems comprise a plurality of parabolic mirrors arranged for converting solar energy into thermal energy for heating a thermal carrier fluid generally contained in a tank.

The thermal carrier fluid heated by the mirrors is, subsequently, subjected to a thermodynamic cycle, for example a Rankine cycle, for generating the steam for supplying a turbine in turn connected to an alternator, thus transforming the accumulated heat energy into electrical energy as it occurs in the common thermoelectric stations.

Thus, the thermodynamic solar systems known today are provided with a supply assembly for the aforementioned turbine which comprises a plurality of heat exchangers and, more in particular, a steam separator, a boiler, an over-heater, a re-overheater and a pre-heater.

Such heat exchangers operate on the first thermal carrier fluid heated by the mirrors and on a second thermal carrier fluid to which the stored heat energy is transferred from the first fluid thus obtaining the steam of supplying the turbine.

The heat exchangers generally used in the thermodynamic solar systems comprise a tube bundle which can be of the fixed-head or U-shaped type and they can be of the type with forced or natural fluidic circulation.

In each case, such heat exchangers are usually arranged in horizontal configuration and i.e. arranged one aside the other forming a supply assembly which develops horizontally with respect to the ground.

With the aim of obtaining this horizontal configuration it is thus necessary to provide a plurality of support structures for the exchangers, as well as a plurality of auxiliary connection pipes which create an actual hydraulic network which may also result to be very close.

A supply assembly like the aforedescribed one reveals some drawbacks.

A first drawback lies in the fact that the supply assemblies currently known are often cumbersome due to the horizontal configuration.

To this, there is added the fact that such horizontal configuration implies not only high design and installation costs but also complex operations of mounting and maintenance.

An object of the present invention is to overcome the aforementioned drawbacks and, in particular, that of creating a supply assembly for a turbine of a solar thermodynamic system having a small volume with respect to the currently known ones.

Another object of the present invention is to provide a supply assembly for a turbine of a solar thermodynamic system capable of simplifying the mounting and maintenance operations.

A further object of the present invention is to provide a solar thermodynamic system that is inexpensive to obtain with respect to the currently known ones.

These and other objects according to the present invention are attained by providing a supply assembly for a turbine of a solar thermodynamic system and a solar thermodynamic system comprising such assembly as outlined in claims 1 and 12.

Further characteristics of the supply assembly for a turbine of a solar thermodynamic system and of the solar thermodynamic system are subject of the dependent claims.

The characteristics and advantages of a supply assembly for a turbine of a solar thermodynamic system and of a solar thermodynamic system according to the present invention shall be more apparent from the following exemplifying and non-limiting description with reference to the attached schematic drawings, wherein.

Figure 1:
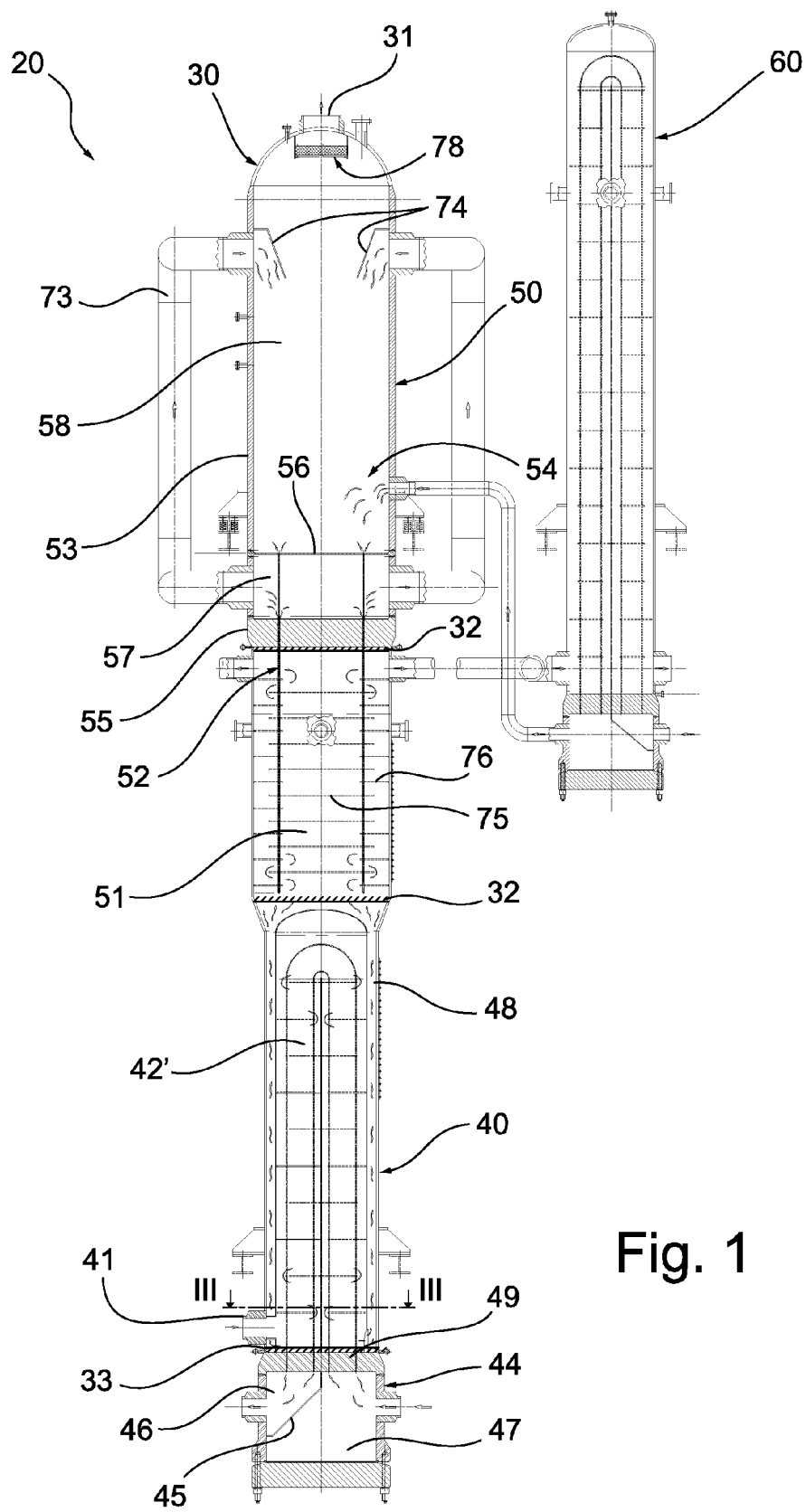
FIG. 1 is a sectional schematic view of a supply assembly for a turbine of a solar thermodynamic system according to the present invention.

With reference to the figures, a solar thermodynamic system is shown indicated in its entirety with 10.

Such solar thermodynamic system 10 comprises a tank 11 for containing a first thermal carrier fluid, a plurality of parabolic mirrors 12 arranged for converting solar energy into thermal energy for heating to a first temperature $T_1$ of the first thermal carrier fluid and a steam turbine 13.

The first thermal carrier fluid may be a molten salt, for example sodium nitrate or potassium nitrate, or it can be a diathermic oil.

In the case where the first fluid is a molten salt, the first temperature $T_1$ is generally comprised between 550° C. and 570° C.; otherwise, in the case where the first fluid is a diathermic oil, the first temperature $T_1$ is lower than 400° C.

According to the present invention the solar thermodynamic system comprises a supply assembly 20 for the turbine 13 according to what is described hereinafter.

Such supply assembly 20 comprises, advantageously, a column structure 30 provided at the upper part with an exit 31 for bleeding the saturated steam and a pre-heating and supplying structure 60.

In particular, the column structure 30 in turn comprises a lower portion 40 and an upper portion 50.

The pre-heating and supplying structure 60 is advantageously arranged for heating a second thermal carrier fluid, typically water, up to a pre-heating temperature $T_4$ and supply it to the upper portion 50 of the column structure 30 for compensating the exit of the bled steam. In particular, the pre-heating and supplying structure 60 comprises a tube bundle heat exchanger for pre-heating said second thermal carrier fluid.

The pre-heating temperature $T_4$ is slightly lower than the saturation temperature corresponding to the pressure that generates in the upper portion 50.

The lower portion 40 is provided with two inlets 41 connected to the tank 11 so as to be supplied with the first thermal carrier fluid heated by the parabolic mirrors at the temperature $T_1$.

In particular, the first thermal carrier fluid is introduced and pushed into forced circulation in the lower portion 40 through the use of one or more pumps (not illustrated).

The lower portion 40 is made of two semicircular sectors respectively comprising a first heat exchanger 42 and a second heat exchanger 43 combined in a single apparatus and arranged to be supplied with the second thermal carrier fluid, typically water in the steam state, respectively at a overheated or saturation temperature T2 and re-overheating temperature T3. Thus, the first fluid performs two exchange passages, the first upwards and the second downwards, during which it heats the second fluid cooling in turn.

The over-heating or saturation temperature T2 is a function of the pressure that generates in the upper portion 50.

The re-overheating temperature T3 is typically substantially equivalent to the over-heating or saturation temperature T2.

The lower portion 40 comprises for each semicircular sector a base chamber 44 provided with a first partition 45 adapted to create a first 46 and a second sub-chamber respectively containing the second overheated fluid or the second re-overheated fluid, and a heat exchange chamber 48 superimposed at the base chamber 44 and within which the first heat exchanger 42 and the second heat exchanger 43 are arranged. The heat exchange chamber 48 is separated from the base chamber 44 by interposing a separation tube sheet 49.

The first heat exchanger 42 and the second heat exchanger 43 are made respectively through a first tube bundle 42' and a second tube bundle 43' U-shaped and parallel to each other which face in the first 46 and the second 47 sub-chamber.

Thus, the first thermal carrier fluid is introduced (on the jacket side of the exchangers) into the heat exchange chamber 48 through the inlets 41 and surrounds the tube bundles 42' and 43' traversed by the fluids in over-heating and re-overheating, thus exchanging heat with them.

Following the first two aforementioned exchange passages, the first fluid performs—re-ascending—a third adiabatic exchange passage in the interspace comprised between the external of the tube bundles 42' and 43' and the external jacket of the lower portion 40.

The first tube bundle 42' and the second tube bundle 43' are supplied so that the second overheated fluid and the second re-overheated fluid are counter-current with respect to the first fluid.

The upper portion 50 is advantageously fluidically connected with the lower portion 40 and arranged above it. In particular, as observable from the FIG. 1, the upper portion is superimposed to the heat exchange chamber 48. Thus, the first thermal carrier fluid, cooling during the heat exchange with the second fluid in the lower portion 40, may freely pass from such lower portion 40 to the upper portion 50.

The upper portion 50 comprises a boiler 51, 52 arranged to bring the second fluid from the saturated liquid state to the mixed state of saturated steam and saturated liquid following the heat exchange with the first fluid; the partial boiling occurs at the boiling temperature T5 which is equivalent to the temperature of saturation corresponding to the pressure that generates in the upper portion 50.

The upper portion 50 further comprises a cylindrical body 53 arranged over such boiler 51, 52 for the separation of the saturated steam duly de-humidified to be sent to the two sub-chambers 46 and 47 of the base chamber 44.

In an embodiment of the present invention, the cylindrical body 53 comprises a header chamber 54 supplied by the pre-heating and supplying structure 60 so as to contain the second fluid pre-heated to a preset level.

Preferably, in order to maintain the level of the second fluid at the aforementioned predetermined value, the header chamber 54 is provided with a plurality of means (not illustrated) for the detection and the control of the level of the second fluid; the level of the fluid in the header chamber 54 guarantees the natural circulation of the second substantially saturated fluid inside the boiler 51, 52.

The boiler 51, 52, specifically, comprises an intermediate boiling chamber 51 fluidically connected with the lower portion 40 and, more in particular, with the heat exchange chamber 48 and connected at the upper part with the header chamber 54 by interposing a first tube sheet 55, as illustrated in FIG. 1.

Advantageously, the intermediate boiling chamber 51 is internally provided with a plurality of disc diaphragms 75 and a plurality of crown diaphragms 76 alternatingly arranged with respect to each other in vertical succession defining a zig zag re-ascent path of the first fluid.

The header chamber 54 comprises a second tube sheet 56 which defines a lower compartment 57 of the header chamber 54, where the mixture of the second fluid in the liquid state and saturated steam is collected, and an upper compartment 58 of the header chamber 54.

Specifically, the boiler 51, 52 comprises a third tube bundle of the so-called "bayonet" 52 type vertically extending from the header chamber 54 to the intermediate chamber 57 passing through the first tube sheet 55.

Figure 2:
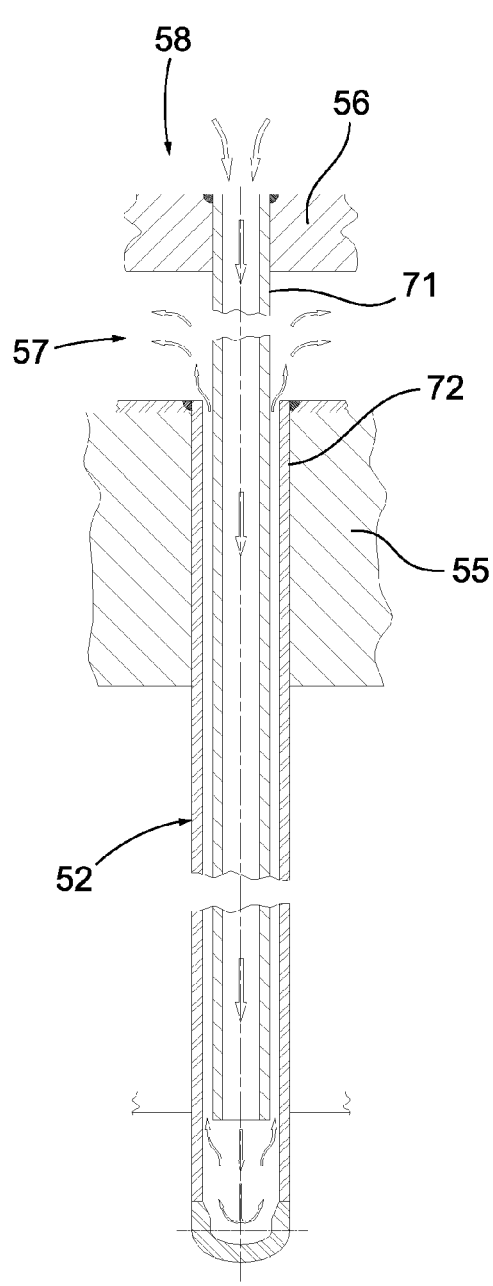
FIG. 2 is a sectional schematic view of a heat exchanger element comprised in a boiler of the supply assembly of FIG. 1.
Figure 3:
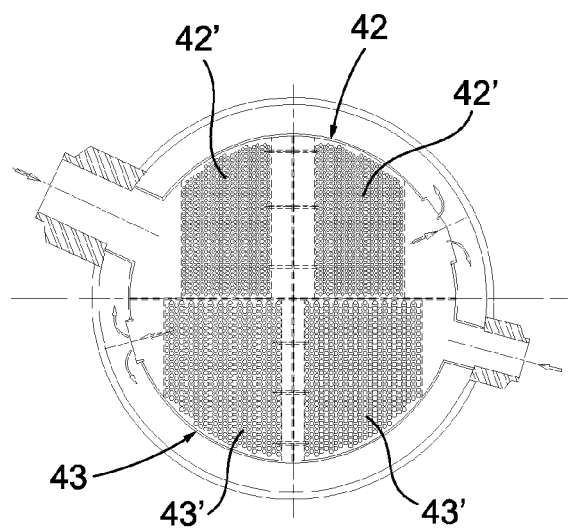
FIG. 3 is a sectional schematic view along line III-III of an exchange chamber comprised in the supply assembly of FIG. 1.

In particular, as observable in FIG. 2, each tube of the third tube bundle 52 comprises an inner duct 71 facing the upper compartment 58 so as to be supplied with the second substantially saturated fluid, and an outer duct 72 coaxial with respect to the inner duct 71 so as to create an interspace between them. Such outer duct 72 faces the lower compartment 57 for introducing the mixture of the second fluid in the liquid state and saturated steam thereinto. Thus, the second fluid contained in the header chamber 54 enters into the inner duct 71 and re-ascends through the outer duct 72 up to the lower compartment 57. During the re-ascent through the outer duct 72, the second fluid exchanges heat with the first fluid presents in the intermediate boiling chamber 51 generating steam bubbles.

Advantageously, the lower compartment 57 is fluidically connected to the upper compartment 58 through at least one feeding duct 73 outside the header chamber 57, 58. Thus, the second fluid at the boiling temperature T5 corresponding to the pressure that generates in the cylindrical body 53 is carried in the upper compartment where the separation between the liquid state and the steam state occurs.

Firstly, such separation occurs due to the action of a drainer 74 that the header chamber 57, 58 is provided with and, subsequently, due to a grid 78 arranged beneath the exit of dry saturated vapour 31.

Preferably, the supply assembly 10 comprises a heating element 77 which winds the heat exchange chamber 48 of the lower portion 40 and the intermediate boiling chamber 51 for maintaining the first thermal carrier fluid to a temperature greater than the freezing temperature thereof.

Figure 4:
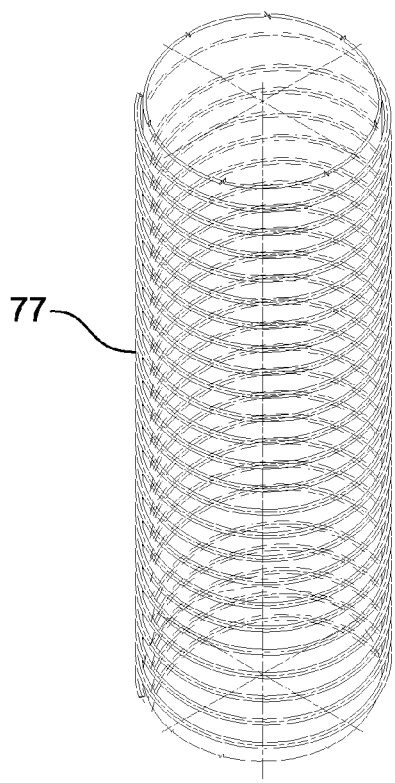
FIG. 4 is a schematic perspective view of a heating element with which the supply assembly of FIG. 1 is provided.
Figure 5:
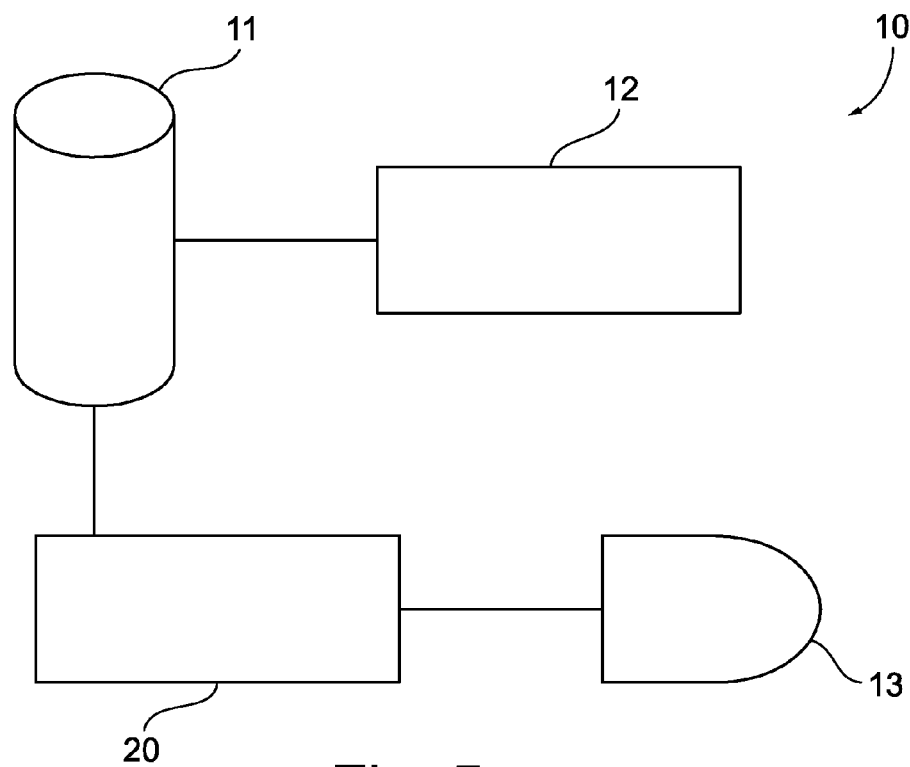
FIG. 5 is a block diagram of a solar thermodynamic system according to the present invention.
Figure 6:
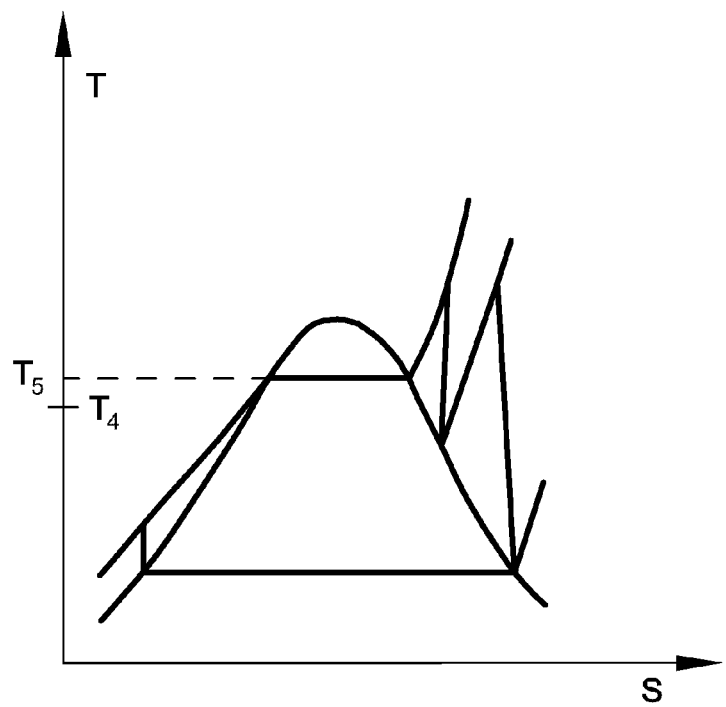
FIG. 6 is a schematic chart representing the thermodynamic cycle actuated in the supply assembly of FIG. 1.

In particular, as observable from FIG. 4, the heating element 77 may be obtained through a helical resistance which is fitted around the heat exchange chamber 48 and the intermediate boiling chamber 51.

Advantageously, the column structure 30 comprises a venting and draining system which can be positioned in an optimal manner given the cylindrical symmetry of the column structure 30. Specifically, such venting and draining system comprises one or more venting tores 32 and one or more draining tores 33.

The venting tore 32 may be positioned so as to suction both at the upper part at the head of the tube bundles 42' and 43' of the heat exchange chamber 48, as well as at the highest point of the circuit of the first thermal carrier fluid, i.e. at the lower part of the first tube sheet 55. The drainage tore 33 may be positioned so as to drain in the lowest point of the circuit, i.e. at the upper part with respect to the separation tube sheet 49.

The configuration of the venting and drainage system guarantees the safety of the supply assembly due to the vertical orientation of the structure 30 which facilitates the venting of the hot fluid from the lowest point of the system.

The outlined description clearly shows the characteristics and advantages of the supply assembly for a turbine of a solar thermodynamic system and of the solar thermodynamic system subject of the present invention.

Actually, the supply assembly according to the present invention develops in a column structure, except for the sole pre-heating and supplying structure.

Thus, this guarantees a small volume with respect to the supply assemblies known in the prior art.

In addition, the column structure is easy and quick to be mounted additionally limiting the use of auxiliary tubes. This makes the various components of the column structure easily accessible for performing maintenance operations.

Lastly it is clear that the supply assembly for a turbine of a solar thermodynamic system and the solar thermodynamic system thus conceived can be subjected to numerous modifications and variants, all falling within the scope of protection of the invention; in addition, all details can be replaced by technically equivalent elements. In practice the materials used, as well as the sizes, may vary according to the technical requirements.

The invention claimed is:

1. Supply assembly for a turbine of a solar thermodynamic system of the type provided with a plurality of parabolic mirrors arranged for converting solar energy into thermal energy for heating a first thermal carrier fluid contained in a tank to a first temperature, comprising:
   a column structure provided at the upper part with an exit for bleeding saturated dry steam:
   a lower portion provided with two inlets connected to said tank such as to be supplied with said first thermal carrier fluid heated by said mirrors, said lower portion comprising a first heat exchanger and a second heat exchanger arranged for being supplied with a second thermal carrier fluid at an overheating temperature and re-overheating temperature, respectively;
   an upper portion fluidically connected to said lower portion and arranged above it so that said first thermal carrier fluid can pass from said lower portion to said upper portion, said upper portion comprising a boiler arranged for bringing said second fluid at a boiling temperature following the heat exchange with said first fluid, and a cylindrical body arranged on said boiler for generating steam for supplying said turbine;
   a preheating and supplying structure arranged for heating said second thermal carrier fluid up to a preheating temperature and supplying said upper portion of said column structure with it.

2. Supply assembly according to claim 1 wherein said lower portion is made up with two semicircular sectors and comprises for each semicircular sector a base chamber provided with a first partition suitable for creating a first and a second sub-chambers containing said second overheated fluid and said second re-overheated fluid, respectively, and a heat exchange chamber overlapping said base chamber and wherein said first heat exchanger and said second heat exchanger are arranged.

3. Supply assembly according to claim 2 wherein said first heat exchanger and said second heat exchanger are made through a first tube bundle and a second tube bundle, U-shaped and parallel to each other facing said first and said second sub-chambers, respectively, for being supplied.

4. Supply assembly according to claim 2 wherein said first heat exchanger and said second heat exchanger are supplied in such a way that said second overheated fluid and said second re-overheated fluid flow counter-current with respect to said first fluid.

5. Supply assembly according to claim 1 wherein said cylindrical body comprises a header chamber supplied by said pre-heating and supplying structure so as to contain said second pre-heated fluid to a preset level, and in that said boiler comprises an intermediate boiling chamber fluidically connected to said lower portion and connected at the top to said header chamber by interposing a first tube sheet.

6. Supply assembly according to claim 5 wherein said header chamber comprises a second tube sheet defining a lower compartment of said header chamber and an upper compartment of said header chamber, and in that said boiler comprises a third tube bundle vertically extending from said header chamber to said intermediate chamber passing through said first tube sheet, each tube of said third tube bundle comprising an inner duct facing said upper compartment so as to be supplied with said second fluid in saturated liquid state, and an outer duct coaxial to said inner duct so as to create an interspace between said ducts, said outer duct facing said lower compartment for supplying it with said second fluid at said boiling temperature.

7. Supply assembly according to claim 6 wherein said lower compartment is fluidically connected to said upper compartment through at least a feeding duct outside said header chamber.

8. Supply assembly according to claim 4 wherein the intermediate boiling chamber is provided inside it with a plurality of disc diaphragms and a plurality of crown-shaped diaphragms alternatingly arranged with respect to each other in a vertical sequence defining a zigzag-shaped rising path of said first fluid.

9. Supply assembly according to claim 4 wherein said header chamber is provided with a drainer arranged for acting on said second boiling fluid separating said second fluid in liquid state from said second fluid in vapour state.

10. Supply assembly according to claim 4 wherein said header chamber is provided with means for detecting and controlling the level of said second fluid in liquid state.

11. Supply assembly according to claim 4 wherein it comprises a heating element enveloping said heat exchange chamber of said lower portion and said intermediate boiling chamber for keeping said first fluid at a temperature higher than its freezing temperature.

12. Solar thermodynamic system comprising:
   a tank for containing a first thermal carrier fluid;
   a plurality of parabolic mirrors arranged for converting solar energy into thermal energy for heating said first thermal carrier fluid contained in said tank to a first temperature;
   a turbine;
   a supply assembly for said turbine according to claim 1.

* * * * *